(12) United States Patent
Nakashima et al.

(10) Patent No.: US 11,236,785 B2
(45) Date of Patent: Feb. 1, 2022

(54) POWER TRANSMISSION DEVICE (71) Applicant: Mazda Motor Corporation, Hiroshima (JP)

(72) Inventors: Kyosei Nakashima, Aki-gun (JP); Masanori Sasaki, Aki-gun (JP); Takayuki Ikemoto, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 17/071,168

(22) Filed: Oct. 15, 2020

(65) Prior Publication Data
US 2021/0148416 A1  May 20, 2021

(30) Foreign Application Priority Data

Nov. 18, 2019  (JP) .............................. JP2019-207991

(51) Int. Cl.
| F16D 25/12 | (2006.01) |
|---|---|
| F16D 13/52 | (2006.01) |
| F16D 25/0638 | (2006.01) |
| F16F 15/123 | (2006.01) |
| F16F 15/129 | (2006.01) |
| F16D 3/12 | (2006.01) |

(52) U.S. Cl.
CPC ............. *F16D 25/12* (2013.01); *F16D 13/52* (2013.01); *F16D 25/0638* (2013.01); *F16F 15/123* (2013.01); *F16F 15/129* (2013.01); *F16D 3/12* (2013.01); *F16D 2300/06* (2013.01); *F16D 2300/22* (2013.01); *F16F 15/12353* (2013.01); *F16F 2230/04* (2013.01); *F16F 2232/02* (2013.01)

(58) Field of Classification Search
CPC .... F16D 25/0638; F16D 25/12; F16D 25/123; F16D 3/12; F16D 3/14; F16D 3/66; F16D 13/52; F16D 13/69; F16D 13/74; F16D 47/02; F16D 2300/06; F16D 2300/22; F16H 15/123; F16H 15/12353; F16H 15/129; F16H 2228/04; F16H 2230/04; F16H 2230/30; F16H 2232/02
USPC ....................................................... 192/85.25
See application file for complete search history.

(56) References Cited

U.S. PATENT DOCUMENTS

| 2006/0144665 A1* | 7/2006 | Janson ................ F16D 25/0638 |
|---|---|---|
| | | 192/48.8 |
| 2011/0088958 A1* | 4/2011 | Ebert ....................... B60K 6/40 |
| | | 180/65.22 |

FOREIGN PATENT DOCUMENTS

JP          2017067169 A          4/2017

* cited by examiner

*Primary Examiner* — Richard M Lorence
(74) *Attorney, Agent, or Firm* — Alleman Hall Creasman & Tuttle LLP (57) ABSTRACT

A power transmission device is provided, which includes a vibration reducing damper provided on a power transmission path, and a clutch mechanism having a plurality of friction plates, a hydraulic pressure chamber, and a centrifugal balance chamber provided opposed to the hydraulic pressure chamber. The clutch mechanism is provided adjacent to an axial side part of the damper, and an oil drain port for hydraulic fluid supplied to the centrifugal balance chamber of the clutch mechanism is provided at a location radially inward of the damper and axially overlapping with the damper.

16 Claims, 3 Drawing Sheets

POWER TRANSMISSION DEVICE

TECHNICAL FIELD

The present disclosure relates to a power transmission device mounted on a vehicle, and more particularly to a power transmission device provided on a power transmission path with a damper for reducing vibration.

BACKGROUND OF THE DISCLOSURE

Conventionally, as disclosed in JP2017-067169A, it is known that a power transmission device with a centrifugal pendulum damper in which part of lubricant supplied toward a clutch is supplied to a centrifugal balance chamber, and the lubricant used for lubricating the clutch is supplied to the centrifugal pendulum damper by using rotation of a clutch drum.

Here, a lubrication circuit (lubrication path) as disclosed in JP2017-067169A has various components (the clutch, the clutch drum, etc.) in the path for supplying the lubricant to the damper. However, since those components apply drag to a flow of the lubricant, the work of the oil pump which supplies the lubricant increases, and the size of the oil pump must be increased accordingly. Alternatively, if dedicated paths are provided for the respective components which need to be lubricated, an amount of lubricant to be supplied increases and the work of the oil pump also increases. Therefore, it becomes more difficult to secure the path layout. Regarding these problems, an efficiently lubrication of the damper is demanded.

Meanwhile, the present inventors acquired data from model analysis of a vehicle power transmission path in which, in a power transmission device provided with a motor as a drive source, the addition of the motor results in a resonance point of the power transmission system (e.g., a resonance frequency of the entire power transmission system from an engine to wheels through the power transmission device, a transmission, a drive shaft, etc.) occurring in a normally-used range of the engine speed. Such a resonance frequency occurring in the normally-used range is a factors in causing vibration and noise of the vehicle.

Regarding such a problem, in order to lower the resonance point of the power transmission system down to a low speed range which is outside of the normally-used range of the engine, while reducing the vibration at the resonance point, providing a damper with hysteresis property may be considered. Moreover, in order to give such a hysteresis property, it is effective to provide a sliding part to the damper; however, it is necessary to supply a certain amount of lubricant to the sliding part.

In order to achieve this, if the lubrication circuit disclosed in JP2017-067169A is used, the lubrication efficiency gets worse because the plurality of components are provided to the lubrication circuit.

SUMMARY OF THE DISCLOSURE

The present disclosure is made in view of solving the problems described above, and one purpose thereof is to provide a power transmission device capable of efficiently and effectively lubricating a damper.

According to one aspect of the present disclosure, a power transmission device is provided, which includes a damper provided on a power transmission path, configured to reduce vibration, and a clutch mechanism having a plurality of friction plates, a hydraulic pressure chamber, and a centrifugal balance chamber provided opposed to the hydraulic pressure chamber. The clutch mechanism is provided adjacent to an axial side part of the damper. An oil drain port for hydraulic fluid supplied to the centrifugal balance chamber of the clutch mechanism is provided at a location radially inward of the damper and axially overlapping with the damper.

According to this structure, the clutch mechanism is provided so as to be adjacent to the axial side part of the damper, and the oil drain port for hydraulic fluid which is supplied to the centrifugal balance chamber is provided at the location radially inward of the damper where it overlaps with the damper in the axial direction. Therefore, the hydraulic fluid released from the centrifugal balance chamber of the clutch mechanism and discharged from the oil drain port can be used for lubricating the damper as lubricant, and thereby, the damper can be efficiently and effectively lubricated.

The power transmission device may further include a motor. The damper may be a motor vibration reducing damper configured to lower a resonance frequency of a power transmission system from an engine to wheels through the power transmission device and a transmission to a range lower than a normally-used range of the engine, the resonance frequency being due to the motor.

According to this structure, in the power transmission device provided with the motor, the resonance frequency of the power transmission system of the vehicle which occurs in the engine normally-used range due to the addition of the motor can be lowered to a range lower than the engine normally-used range by the motor vibration reducing damper, and thereby, vibration and noise of the vehicle in the normally-used range of the engine (e.g., where the engine speed is 1,000 rpm or higher) can be reduced.

A friction generating mechanism configured to cause the damper to generate a given hysteresis property during power transmission may be provided to the damper.

According to this structure, the hysteresis property by the damper can effectively reduce the magnitude of the vibration which occurs at the resonance frequency of the power transmission system lowered to the range lower than the engine normally-used range.

The power transmission device may further include a seal plate provided on the damper side and defining the centrifugal balance chamber, and a backup ring having a given axial length to support the seal plate. A through-hole extending in the axial direction may be formed in the backup ring as an oil passage. The centrifugal balance chamber may communicate with the through-hole of the backup ring. The oil drain port for hydraulic fluid may be an exit part of the through-hole of the backup ring. The oil drain port may be provided only in the backup ring.

According to this structure, since the oil drain port is formed only in the backup ring, all the hydraulic fluid discharged from the oil drain port can be used for lubricating the damper. Moreover, by suitably adjusting the axial length of the backup ring according to the location of the damper, the damper can be efficiently and effectively lubricated.

The power transmission device may further include a seal plate provided on the damper side and defining the centrifugal balance chamber, a backup ring configured to support the seal plate, and an input shaft coupled to an engine. A notch communicating with the centrifugal balance chamber may be formed in the input shaft. A notch may be formed in a side surface part of the backup ring on the seal plate side. A through-hole extending in the axial direction may be formed in the backup ring, and an exit part of the through-hole may be formed as the oil drain port for hydraulic fluid. The notch of the input shaft, the notch of the backup ring, and the through-hole of the backup ring may communicate with each other and may be formed as oil passages configured to discharge hydraulic fluid from the centrifugal balance chamber.

According to this structure, the hydraulic fluid supplied to the centrifugal balance chamber through the notch of the input shaft maintains the hydraulic pressure of the centrifugal balance chamber at required hydraulic pressure, and the notch of the input shaft, and the notch and the through-hole of the backup ring form the oil passages. Therefore, the hydraulic fluid inside the centrifugal balance chamber can be supplied to the oil drain port of the backup ring through the short and efficient lubrication paths, and thereby, the damper can be efficiently and effectively lubricated.

An oil passage configured to supply hydraulic fluid to the centrifugal balance chamber may be formed along the center axis of the input shaft, and the oil passage of the input shaft may communicate with the centrifugal balance chamber through the notch of the input shaft.

According to this structure, hydraulic fluid can effectively and suitably be supplied and discharged to/from both the centrifugal hydraulic pressure chamber and the oil drain port for hydraulic fluid of the backup ring, from the oil passage of the input shaft through the notch of the input shaft.

DETAILED DESCRIPTION OF THE DISCLOSURE

Figure 1:
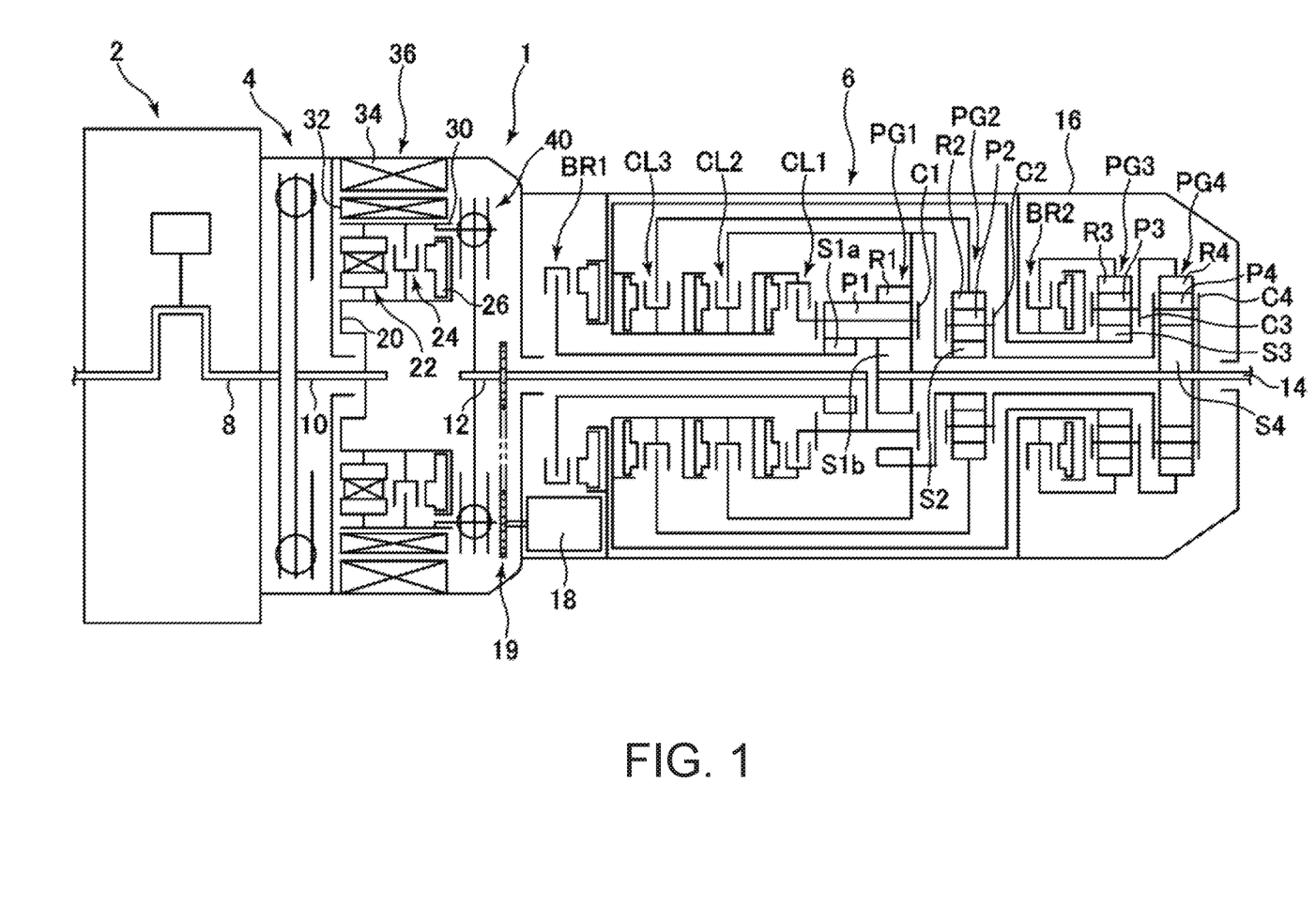
FIG. 1 is a cross-sectional view schematically illustrating a structure of a power transmission device according to one embodiment of the present disclosure, along with an engine, a main damper, and an automatic transmission.

First, an outline structure of a power transmission device according to one embodiment of the present disclosure is described with reference to FIG. 1, along with structures of an engine, a main damper, and an automatic transmission. FIG. 1 is a cross-sectional view schematically illustrating the structure of the power transmission device according to this embodiment of the present disclosure, along with the engine, the main damper, and the automatic transmission.

As illustrated in FIG. 1, reference character "1" is a power transmission device according to this embodiment of the present disclosure. An engine 2 which is an internal combustion engine is provided on the input side of the power transmission device 1, and the engine 2 is provided with a main damper 4 which absorbs a torque fluctuation of the engine 2. The main damper 4 is coupled to a crankshaft 8 of the engine 2. An automatic transmission 6 is provided on the output side of the power transmission device 1.

The power transmission device 1 is provided with an input shaft 10, and a driving force of the engine 2 is transmitted to the input shaft 10 through the main damper 4. Moreover, as will be described later, at a startup of the engine 2, a driving force for starting the engine 2 is transmitted from the power transmission device 1 through the input shaft 10. Moreover, the power transmission device 1 is provided with an output shaft 12 for transmitting the driving force to the automatic transmission 6. Note that the output shaft 12 of the power transmission device 1 is an input shaft or intermediate shaft of the automatic transmission 6. A concrete structure of the power transmission device 1 will be described later.

The automatic transmission 6 includes the output shaft 12, an output shaft 14, and a transmission case 16. Inside the transmission case 16, first, second, third, and fourth planetary gear sets PG1, PG2, PG3, and PG4 are provided on the axial center of the output shaft 12 and the output shaft 14. As illustrated in FIG. 1, the planetary gear sets PG1-PG4 include, as rotating elements, sun gears S1$a$, S1$b$, S2, S3, and S4, ring gears R1, R2, R3, and R4, pinion gears P1, P2, P3, and P4 and carriers C1, C2, C3, and C4 which support the pinion gears, respectively. The planetary gear sets PG1-PG4 also include, as friction engaging elements, a first clutch CL1, a second clutch CL2, a third clutch CL3, a first brake BR1, and a second brake BR2. With the above structure, although the detailed description is omitted, the automatic transmission 6 is configured to form first to eighth gears and a reverse gear by selectively engaging the clutches CL1, CL2, and CL3, and the brakes BR1 and BR2 to switch between power transmission paths through the planetary gear sets PG1, PG2, PG3, and PG4, according to a given engagement table.

Moreover, the automatic transmission 6 is provided with an oil pump 18 which supplies hydraulic fluid or lubricant to each part of the automatic transmission 6 and the power transmission device 1, and the oil pump 18 is driven by an actuator mechanism 19 provided to the output shaft 12 and having sprockets and a chain.

Next, an outline structure of the power transmission device 1 according to this embodiment is described. As illustrated in FIG. 1, the power transmission device 1 includes an inner rotating member 20 (hub member) described later, a one-way clutch 22 (a clutch for transmitting the engine drive torque) coupled to the input shaft 10 through the inner rotating member 20, a multiplate wet clutch 24 coupled to the input shaft 10 through the inner rotating member 20, and a pressure piston 26 which engages the clutch 24.

The power transmission device 1 also includes an outer rotating member 30 (drum member) provided radially outward of the one-way clutch 22 and the clutch 24, and the outer rotating member 30 is coupled to the one-way clutch 22 and the clutch 24. The power transmission device 1 also includes a drive motor 36 having a rotor 32 and a stator 34, and the rotor 32 is coupled to the outer rotating member 30.

Here, although not illustrated, the one-way clutch 22 has a sprag type or a rotor type engaging member therein. The one-way clutch 22 transmits rotation of the inner rotating member 20 to the outer rotating member 30, and does not transmit rotation of the outer rotating member 30 to the inner rotating member 20. That is, the one-way clutch 22 transmits the output of the engine 2 to the motor 36 side. In this embodiment, the one-way clutch 22 is provided in order to compensate a transmitting torque capacity which runs short only with the multiplate wet clutch 24.

Further, the power transmission device 1 is provided with a damper 40 for motor (described later). The motor damper 40 is coupled to the outer rotating member 30 and is coupled to the output shaft 12, and thereby, the driving forces of the engine 2 and/or the motor 36 are transmitted to the automatic transmission 6 through the motor damper 40.

Next, a main basic operation of the power transmission of the power transmission device 1 according to this embodiment is described. In this embodiment, this power transmission device 1 is a device capable of starting the engine when the vehicle is stopped, and propelling the vehicle by the driving force of the engine, propelling the vehicle only by the motor, and starting the engine while the vehicle is traveling. When starting the engine 2, electric power is first supplied to the motor 36 to rotate the rotor 32, and at this time, the clutch 24 is engaged by the pressure piston 26, while the engaging member of the one-way clutch 22 is not locked. Therefore, the power of the motor 36 is transmitted to the input shaft 10 and the crankshaft 8 through the clutch 24 and the inner rotating member 20, and the engine 2 is then started when fuel is injected into the engine 2.

Next, when the engine 2 starts propelling the vehicle, the driving force from the engine 2 is transmitted to the inner rotating member 20 through the input shaft 10. At this time, the clutch 24 is engaged and the engaging member of the one-way clutch 22 is locked so that the power transmitted to the inner rotating member 20 is transmitted to the output shaft 12 through the one-way clutch 22, the clutch 24, the outer rotating member 30, and the motor damper 40.

Next, while the engine 2 is stopped, when the motor 36 starts propelling the vehicle alone, the electric power is supplied to the motor 36 to rotate the rotor 32. At this time, the engaging member of the one-way clutch 22 is not locked and the clutch 24 is disengaged so that the power transmitted to the outer rotating member 30 is transmitted from the motor 36 to the output shaft 12 through the motor damper 40.

Next, when the engine 2 is started while the vehicle is propelled only by the motor 36, the engaging member of the one-way clutch 22 is not locked and the clutch 24 is engaged by the pressure piston 26 so that the power transmitted from the motor 36 to the outer rotating member 30 is transmitted to the input shaft 10 and the crankshaft 8 through the clutch 24 and the inner rotating member 20, and therefore, the engine 2 is started. Moreover, in this case, the power of the motor 36 is transmitted to the output shaft 12 through the outer rotating member 30 and the motor damper 40.

Next, a structure of the power transmission device 1 according to this embodiment is described with reference to FIG. 2. Note that rotating members, such as the inner rotating member 20, the outer rotating member 30, and the damper 40, which will be described below, are members which rotate about the center axis (input shaft 10) of the power transmission device 1, and they are formed about the center axis of the power transmission device 1, fundamentally in an axially symmetry fashion.

Figure 2:
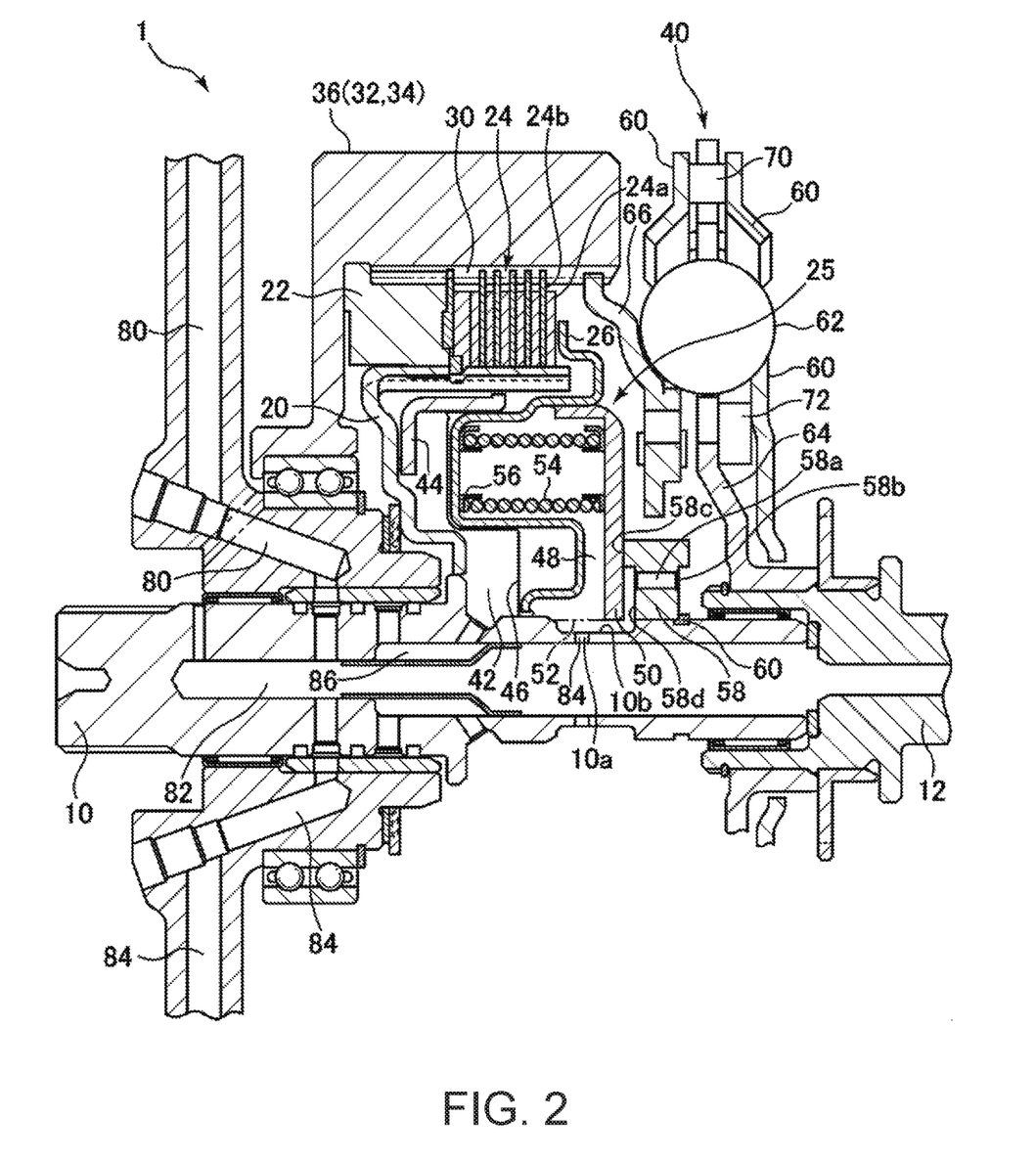
FIG. 2 is a cross-sectional view illustrating a basic structure of the power transmission device according to this embodiment of the present disclosure.

As illustrated in FIG. 2, as described above, the power transmission device 1 includes the input shaft 10, the output shaft 12, the inner rotating member 20, the one-way clutch 22, the multiplate wet clutch 24, the pressure piston 26, the outer rotating member 30, the motor 36 (illustration of the rotor 32 and the stator 34 is omitted), and the motor damper 40. Here, a clutch mechanism 25 includes the clutch 24 and, and mainly a hydraulic pressure chamber 42, a centrifugal hydraulic pressure chamber 48, and coil springs 54, for engaging and disengaging friction plates 24a and 24b of the clutch 24.

The multiplate wet clutch 24 has the plurality of inner friction plates 24a spline-engaged with the inner rotating member 20, and the plurality of outer friction plates 24b spline-engaged with the outer rotating member 30. The plurality of friction plates 24a and 24b are engaged with each other by being biased by the pressure piston 26.

The hydraulic pressure chamber 42 is formed radially inward of the friction plates 24a and 24b, as the clutch mechanism 25, so that the pressure piston 26 biases the friction plates 24a and 24b to the disengaging side. The hydraulic pressure chamber 42 is defined by the inner rotating member 20, a sealing member 44 fixed to the inner rotating member 20, a sealing member 46 fixed to the pressure piston 26, and an outer circumferential surface of the input shaft 10.

Moreover, the centrifugal hydraulic pressure chamber 48 (centrifugal balance chamber) is formed radially inward of the friction plates 24a and 24b, as the clutch mechanism 25, so that it opposes to the hydraulic pressure chamber 42 in the axial direction. The centrifugal hydraulic pressure chamber 48 is defined by the pressure piston 26 and a seal plate 50. In this embodiment, a centrifugal hydraulic pressure originated point of the centrifugal hydraulic pressure chamber 48 is located at an imaginary line 52, and it is located at the same radial position as a radially inward edge of the seal plate 50. Oil passages for supplying hydraulic fluid to the hydraulic pressure chamber 42 and the centrifugal hydraulic pressure chamber 48 will be described later.

Moreover, inside the centrifugal hydraulic pressure chamber 48, the coil springs (biasing springs) 54 for biasing the friction plates 24a and 24b to the engagement side by the pressure piston 26 are provided as the clutch mechanism 25. The springs 54 are held by a retainer 56. The biasing force of the springs 54 is set so that it can sufficiently maintain the engaging force of the friction plates 24a and 24b, when the engine 2 is driven by the motor 36 (i.e., when the power (torque) of the motor 36 is transmitted to the engine 2 through the clutch 24).

The seal plate 50 is a disk-shaped member radially extending around the input shaft 10, and it is supported by a backup ring 58 (described later) throughout the circumference. An upper edge part of the seal plate 50 and the pressure piston 26 are constructed so that the centrifugal hydraulic pressure chamber 48 is sealed. The backup ring 58 extends radially in an annular shape around the input shaft 10, and its inner diameter part is engaged with the input shaft 10. Moreover, the backup ring 58 is fixed to a snap ring in the axial direction.

Note that the centrifugal hydraulic pressure chamber 48 (centrifugal balance chamber) is provided to improve controllability of the clutch engagement. That is, the centrifugal hydraulic pressure chamber 48 is a hydraulic pressure chamber provided in order to balance the hydraulic pressure inside the hydraulic pressure chamber 42 so as to suppress the springs 54 from being pushed back when the hydraulic pressure chamber 42 rotates at high speed and a centrifugal hydraulic pressure inside the hydraulic pressure chamber 42 from increasing.

Next, the motor damper 40 is described. The motor damper 40 includes outer members 60 (driving-side members) each having a disk shape and coupled to the outer rotating member 30, which rotate synchronously with the outer rotating member 30, a coil spring 62 extending radially for causing the motor damper 40 to function as a torsion damper, an inner member 64 (driven-side member) having a disk shape which is spline-engaged with the output shaft 12 at an inward edge part and transmits a driving force from the motor damper 40 to the output shaft 12, and a stop (not illustrated) for suppressing a relative torsional displacement of the inner member 64 with respect to the outer members 60 at about 20° to 30°. Moreover, the outer rotating member 30 is provided with a coupling member 66 which couples the outer rotating member 30 to the outer members 60 and transmits a driving force to the outer members 60.

Moreover, as illustrated in FIG. 2, the motor damper 40 is provided adjacent to the clutch mechanism 25 including the centrifugal hydraulic pressure chamber 48 in the axial direction (the axial direction of the damper 40, the axial direction of the power transmission device 1, the axial direction of the input shaft 10 and the output shaft 12). In more detail, in this embodiment, the clutch mechanism 25 is disposed adjacent to the outer member 60 on the clutch mechanism 25 side (an axial side part of the damper 40) among the outer members 60 of the damper 40.

With such a structure, the driving force by the rotation of the outer rotating member 30 is transmitted to the output shaft 12 through the coupling member 66, the outer members 60 of the motor damper 40, the coil spring 62 (or the stop), and the inner member 64.

Moreover, the motor damper 40 having such a structure can lower the rigidity of the power transmission device 1 and also lower the rigidity of the vibration transmission system of the vehicle. Here, the term "rigidity" as used herein refers to, for example, a rigidity which affects vibration when considering the power transmission system from the engine to the vehicle wheels as a spring-mass model. The lowering in the rigidity corresponds to lowering of an elastic force of the spring in the spring mass model, and a hysteresis mechanism (described later) of the motor damper 40 corresponds to viscosity in the spring mass model. Note that when considering in the spring mass model, an approach of increasing inertia of the power transmission device, which is different from this embodiment, may also be adopted in order to lower the resonance point of the power transmission system.

In this embodiment, the motor damper 40 in the power transmission device 1 provided with the motor 36 is configured so that the resonance frequency of the entire power transmission system which is caused in the normally-used range of the engine 2 (e.g., the engine speed is 1,000 rpm or higher) due to the addition of the motor 36 is lowered to a speed range lower than the normally-used range (e.g., less than 1,000 rpm) by lowering the rigidity by the damper 40 as described above. Therefore, the vibration and the noise of the vehicle can be reduced, and in this regard, the motor damper 40 functions as a damper for reducing the vibration. Note that in this embodiment, the entire power transmission system is considered as the power transmission system from the engine 2 to the wheels (not illustrated) through the main damper 4, the power transmission device 1, the automatic transmission 6, the drive shaft, etc.

Moreover, the motor damper 40 is provided with a first hysteresis property generating mechanism 70 and a second hysteresis property generating mechanism 72, each of which may be referred to as a "friction generating mechanism." Although illustration is omitted, the first hysteresis property generating mechanism 70 is comprised of a slide protrusion and a disk spring (outer member 60) which contacts the slide protrusion. Although illustration is omitted, the second hysteresis property generating mechanism 72 is comprised of a friction plate and a disk spring (outer member 60) which contacts the friction plate.

In this embodiment, such hysteresis property generating mechanisms 70 and 72 reduce the magnitude of the vibration by the resonance frequency being lowered to the speed range lower than the normally-used range as described above, and smoothen the peak(s) of the vibration. Note that as a modification, the hysteresis property generating mechanism may be either one of the first hysteresis property generating mechanism 70 and the second hysteresis property generating mechanism 72. Thus, since the sliding part (the slide protrusion and the disk spring, and the friction plate and the disk spring) according to the hysteresis property generating mechanisms 70 and 72 is formed in the motor damper 40 of this embodiment, it is necessary to continuously supply a certain amount of lubricant to the damper 40 (especially, to such a sliding part), while the engine and/or the motor is operated.

Figure 3:
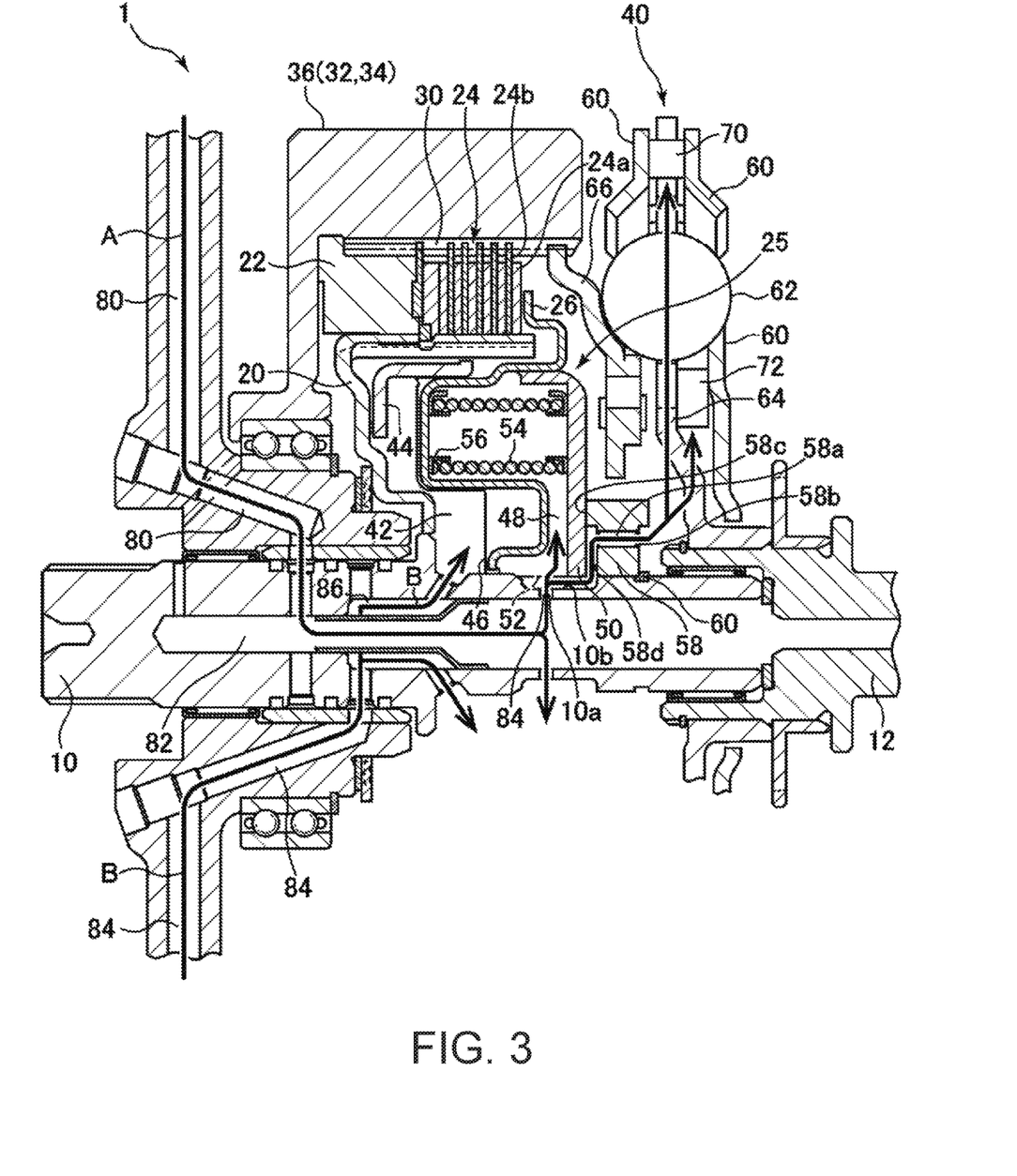
FIG. 3 is a cross-sectional view illustrating a flow of hydraulic fluid in the power transmission device which is illustrated similarly to FIG. 2.

Next, a structure for supplying lubricant to the oil passages of the power transmission device 1 according to this embodiment and to the motor damper 40 is described with reference to FIGS. 2 and 3. FIG. 2 is a cross-sectional view illustrating a basic structure of the power transmission device according to this embodiment of the present disclosure, and FIG. 3 is a cross-sectional view illustrating a flow of the hydraulic fluid in the power transmission device which is illustrated similarly to FIG. 2. First, as illustrated in FIG. 2, the backup ring 58 which contacts and supports the seal plate 50 has a given thickness in the axial direction (the same direction as the axial direction of the power transmission device 1, the input shaft 10, and the output shaft 12). The thickness of the backup ring 58 in the axial direction is adjusted so that the backup ring 58 has a given rigidity, and hydraulic fluid discharged from oil drain ports 58b (described later) of the backup ring 58 efficiently reaches the motor damper 40 as lubricant.

The backup ring 58 is a member radially extending in an annular shape, and as illustrated in FIG. 2, a plurality of (e.g., four) through-holes 58a (communicating holes) extending in the axial direction are formed in the backup ring 58 at a given interval in the circumferential direction. The through-holes 58a are holes for discharging hydraulic fluid inside the centrifugal hydraulic pressure chamber 48, and the hydraulic fluid inside the centrifugal hydraulic pressure chamber 48 is discharged from exit parts of the through-holes 58a. That is, the exit part of the backup ring 58 functions as the oil drain port 58b.

The plurality of oil drain ports 58b formed in the radial direction are located radially inward of and axially overlapping with the motor damper 40 described above. Moreover, in the power transmission device 1 of this embodiment, the hydraulic fluid inside the centrifugal hydraulic pressure chamber 48 is discharged only from the plurality of oil drain ports 58b of the backup ring 58.

The backup ring 58 is in contact with the seal plate 50 so that the seal is secured by a metal-to-metal contact at a contact part 58c between the backup ring 58 and the seal plate 50. Moreover, notches 58d are formed in the backup ring 58 on the seal plate 50 side, as oil passages for leading the hydraulic fluid discharged from the centrifugal hydraulic pressure chamber 48.

Next, the oil passages formed in the power transmission device 1 are described. As illustrated in FIGS. 2 and 3, an oil passage 80 for supplying hydraulic fluid from the oil pump 18 (see FIG. 1) described above to the centrifugal hydraulic pressure chamber 48, and an oil passage 82 which communicates with the oil passage 80 and extends along the center axis of the input shaft 10 are formed in the power transmission device 1. As illustrated in FIG. 2, communicating holes 10a (oil passages) and notches 10b are formed in the input shaft 10 at locations corresponding to the centrifugal hydraulic pressure chamber 48 in the axial direction and the radial direction. The plurality of communicating holes 10a (oil passages) and notches 10b are formed in the radial direction of the input shaft 10. In this embodiment, the communicating hole 10a and the notch 10b are formed at the same location.

Moreover, the plurality (e.g., four) of notches 10*b* are provided at a given interval in the circumferential direction, and these locations correspond to the locations of the plurality of through-holes 58*a* and notches 58*d* of the backup ring 58. The inward edge part of the seal plate 50 engages with the input shaft 10 at a part where the notches 10*b* of the input shaft 10 are not formed to form the centrifugal hydraulic pressure originated point 52 while forming the seal. Note that the hydraulic fluid of the oil passage 82 of the input shaft is also supplied to a lubrication circuit of the automatic transmission 6.

By such a structure of the oil passages, in this embodiment, as illustrating a flow of the hydraulic fluid or lubricant by an arrow A in FIG. 3, the hydraulic fluid is first supplied from the oil passages 80 and 82 to the centrifugal hydraulic pressure chamber 48 so that a given hydraulic pressure occurs at the centrifugal hydraulic pressure originated point 52 as a reference. Then, when an amount of hydraulic fluid which causes a given hydraulic pressure is supplied to the centrifugal hydraulic pressure chamber 48, the remaining hydraulic fluid is discharged from the oil drain ports 58*b* through the notches 10*b* of the input shaft 10, and the notches 58*d* and the through-holes 58*a* of the backup ring 58. As illustrated by the arrow A, the discharged hydraulic fluid is supplied to the damper 40 (especially, to the hysteresis property generating mechanisms 70 and 72 of the damper 40).

Moreover, as illustrated in FIGS. 2 and 3, an oil passage 84 for supplying hydraulic fluid from the oil pump 18 (see FIG. 1) to the hydraulic pressure chamber 42, and an oil passage 86 which communicates with the oil passage 84 and extends in the circumferential direction around the center axis of the input shaft are formed in the power transmission device 1. This oil passage 86 is formed in an annular shape on the outer circumferential side of the oil passage 82 described above. Then, as illustrated by an arrow B in FIG. 3, hydraulic fluid is supplied to the hydraulic pressure chamber 42. The hydraulic fluid is supplied to the hydraulic pressure chamber 42 through such oil passages 84 and 86, and when the pressure piston 26 is pushed back and the volume of the centrifugal hydraulic pressure chamber 48 is reduced, the hydraulic fluid inside the centrifugal hydraulic pressure chamber 48 is discharged from the oil drain ports 58*b* through the notches 10*b* of the input shaft 10, and the notches 58*d* and the through-holes 58*a* of the backup ring 58.

Thus, the hydraulic fluid discharged from the oil drain port 58*b* is supplied to the motor damper 40 as lubricant by the centrifugal force when the engine 2 is operated, because the input shaft 10 is rotated. In more detail, especially, the certain amount of lubricant is supplied to the sliding part according to the hysteresis property generating mechanisms 70 and 72.

On the other hand, when the engine 2 is stopped, since the input shaft 10 is not rotated, the hydraulic fluid discharged from the oil drain ports 58*b* is supplied to the motor damper 40 by gravity as lubricant. In the power transmission device 1 according to this embodiment, the motor damper 40 is rotated when the engine 2 is stopped and the vehicle is propelled only by the motor 36. Therefore, a certain amount of lubricant can be supplied to the sliding part according to the hysteresis property generating mechanisms 70 and 72 also by the supply of lubricant by gravity.

Next, operation and effects according to this embodiment of the present disclosure are described. First, in this embodiment of the present disclosure, the damper 40 for reducing vibration is provided on the power transmission path of the power transmission device 1, and the clutch mechanism 25 is provided adjacent to the damper 40 in the axial direction. The clutch mechanism 25 has the hydraulic pressure chamber 42, the centrifugal balance chamber 48 provided opposed to the hydraulic pressure chamber 42, and the engagement springs 54. The oil drain port 58*b* for hydraulic fluid which is supplied to the centrifugal balance chamber 48 of the clutch mechanism 25 is formed at the location radially inward of the damper 40 where it overlaps with the damper 40 in the axial direction. According to the power transmission device 1 of this embodiment constructed in this way, the clutch mechanism 25 is provided to the damper 40 so as to be adjacent to the axial side part of the damper 40 (the part of the outer member 60 on the clutch mechanism 25 side of the damper 40), and the oil drain port 58*b* for hydraulic fluid which is supplied to the centrifugal balance chamber 48 is provided to the damper 40 at the location radially inward of the damper 40 where it overlaps with the damper 40 in the axial direction. Therefore, the hydraulic fluid released from the centrifugal balance chamber 48 of the clutch mechanism 25 and discharged from the oil drain port 58*b* can be used for lubricating the damper 40 as lubricant, and thereby, the damper 40 can be efficiently and effectively lubricated. In particular, the hysteresis property generating mechanisms 70 and 72 of the damper 40 can be lubricated efficiently.

Moreover, the power transmission device 1 according to this embodiment is provided with the motor 36, and the damper 40 is the damper for reducing the motor vibration which lowers the resonance frequency of the power transmission system from the engine 2 to the wheels through the power transmission device 1 and the transmission 6, which is due to the motor 36, down to a range lower than the engine normally-used range. Therefore, in the power transmission device 1 provided with the motor 36, the resonance frequency of the entire power transmission system of the vehicle which occurs in the normally-used range of the engine 2 due to the addition of the motor 36 can be lowered to the range lower than the engine normally-used range, and thereby, the vibration and noise of the vehicle in the normally-used range of the engine 2 (e.g., the engine speed is 1,000 rpm or higher) can be reduced.

Moreover, in this embodiment, since the friction generating mechanisms 70 and 72 for causing the damper 40 to generate the given hysteresis property during the power transmission are provided to the damper 40 (damper for reducing the motor vibration), the hysteresis property by the damper 40 (70, 72) can effectively reduce the magnitude of the vibration by the resonance frequency of the power transmission system being lowered to the range lower than the engine normally-used range.

Moreover, the power transmission device 1 according to this embodiment includes the seal plate 50 which is provided on the damper 40 side and defines the centrifugal balance chamber 48, and the backup ring 58 having the given axial length for supporting the seal plate 50. The through-holes 58*a* are formed in the backup ring 58 as the oil passages extending in the axial direction. The centrifugal balance chamber 48 communicates with the through-holes 58*a* of the backup ring 58, the exit parts of the through-holes 58*a* of the backup ring 58 are the oil drain ports 58*b* for hydraulic fluid, and the oil drain ports 58*b* for hydraulic fluid are formed only in the backup ring 58. According to this embodiment constructed in this way, since the oil drain ports 58*b* are formed only in the backup ring 58, all the hydraulic fluid discharged from the oil drain ports 58*b* can be used for lubricating the damper 40. Moreover, by suitably adjusting the axial length of the backup ring 58 according to the location of the damper 40, all the hydraulic fluid discharged from the oil drain ports 58b can be effectively used for lubricating the damper.

Moreover, the power transmission device 1 according to this embodiment is provided with the input shaft 10 coupled to the engine 2. The notches 10b communicating with the centrifugal balance chamber 48 are formed in the input shaft 10, and the notches 58d are formed in the side surface part on the seal plate 50 side of the backup ring 58. The through-holes 58a extending in the axial direction are formed in the backup ring 58. Also in the backup ring 58, the exit parts of the through-holes 58a are formed as the oil drain ports 58b for hydraulic fluid. Also in the backup ring 58, the notches 10b of the input shaft 10, the notches 58d of the backup ring, and the through-holes 58a of the backup ring are formed as oil passages which communicate with each other and discharge the hydraulic fluid from the centrifugal balance chamber 48. According to this embodiment constructed in this way, the hydraulic fluid supplied to the centrifugal balance chamber 48 through the notches 10b of the input shaft 10 maintains the hydraulic pressure of the centrifugal balance chamber 48 at the required hydraulic pressure, and the notches 10b of the input shaft 10, and the notches 58d and the through-holes 58a of the backup ring 58 form the oil passages. Therefore, the hydraulic fluid inside the centrifugal balance chamber 48 can be supplied to the oil drain ports 58b of the backup ring 58 through the short and efficient lubrication paths, and thereby, the damper 40 can be efficiently lubricated.

Moreover, in this embodiment, the oil passage 82 for supplying hydraulic fluid to the centrifugal balance chamber 48 is formed along the center axis of the input shaft 10, and the oil passage 82 of the input shaft communicates with the centrifugal balance chamber 48 through the notches 10b of the input shaft. The effective and suitable amount of hydraulic fluid can be supplied and discharged to/from both the centrifugal hydraulic pressure chamber 48 and the oil drain ports 58b for hydraulic fluid of the backup ring, from the oil passage 82 of the input shaft 10 through the notches 10b.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Power Transmission Device
2 Engine
4 Main Damper
6 Automatic Transmission
10 Input Shaft of Power Transmission Device
10a Communicating Hole of Input Shaft
10b Notch of Input Shaft
12 Output Shaft of Power Transmission Device/Input Shaft of Automatic Transmission
18 Oil Pump
20 Inner Rotating Member/Hub Member
22 One-way Clutch
24 Multiplate Wet Clutch
24a Inner Friction Plate
24b Outer Friction Plate
25 Clutch Mechanism
26 Pressure Piston
30 Outer Rotating Member/Drum Member
32 Rotor
34 Stator
36 Drive Motor
40 Motor Damper
42 Hydraulic Pressure Chamber
48 Centrifugal Hydraulic Pressure Chamber (Centrifugal Balance Chamber)
50 Seal Plate
52 Centrifugal Hydraulic Pressure Originated Point of Centrifugal Hydraulic Pressure Chamber
54 Spring for Biasing Pressure Piston and Friction Plate (Biasing Member)
58 Backup Ring
58a Through-Hole of Backup Ring
58b Exit Part of Backup Ring/Oil Drain Port for Hydraulic Fluid of Centrifugal Hydraulic Pressure Chamber
58c Contact Part of Backup Ring
58d Notch of Backup Ring
60 Outer Member of Motor Damper
62 Spring of Motor Damper
64 Inner Member of Motor Damper
66 Coupling Member
70 First Hysteresis Property Generating Mechanism
72 Second Hysteresis Property Generating Mechanism
80, 82 Oil Passage for Centrifugal Hydraulic Pressure Chamber
84, 86 Oil Passage for Hydraulic Pressure Chamber

What is claimed is:

1. A power transmission device, comprising:
   a damper provided on a power transmission path, configured to reduce vibration; and
   a clutch mechanism having a plurality of friction plates, a hydraulic pressure chamber, and a centrifugal balance chamber provided opposed to the hydraulic pressure chamber,
   wherein the clutch mechanism is provided adjacent to an axial side part of the damper, and
   wherein an oil drain port for hydraulic fluid supplied to the centrifugal balance chamber of the clutch mechanism is provided at a location radially inward of the damper and axially overlapping with the damper.

2. The power transmission device of claim 1, further comprising a motor,
   wherein the damper is a motor vibration reducing damper configured to lower a resonance frequency of a power transmission system, from an engine to wheels through the power transmission device and a transmission, to a range lower than a normally-used range of the engine, the resonance frequency being due to the motor.

3. The power transmission device of claim 2, wherein a friction generating mechanism configured to cause the damper to generate a given hysteresis property during power transmission is provided to the damper.

4. The power transmission device of claim 3, further comprising:
   a seal plate provided on the damper side and defining the centrifugal balance chamber; and
   a backup ring having a given axial length to support the seal plate,
   wherein a through-hole extending in the axial direction is formed in the backup ring as an oil passage,
   wherein the centrifugal balance chamber communicates with the through-hole of the backup ring,
   wherein the oil drain port for hydraulic fluid is an exit part of the through-hole of the backup ring, and
   wherein the oil drain port is provided only in the backup ring.

5. The power transmission device of claim 3, further comprising:
a seal plate provided on the damper side and defining the centrifugal balance chamber;
a backup ring configured to support the seal plate; and
an input shaft coupled to an engine,
wherein a notch communicating with the centrifugal balance chamber is formed in the input shaft,
wherein a notch is formed in a side surface part of the backup ring on the seal plate side,
wherein a through-hole extending in the axial direction is formed in the backup ring and an exit part of the through-hole is formed as the oil drain port for hydraulic fluid, and
wherein the notch of the input shaft, the notch of the backup ring, and the through-hole of the backup ring communicate with each other and are formed as oil passages configured to discharge hydraulic fluid from the centrifugal balance chamber.

6. The power transmission device of claim 5, wherein an oil passage configured to supply hydraulic fluid to the centrifugal balance chamber is formed in the input shaft along the center axis thereof, and the oil passage of the input shaft communicates with the centrifugal balance chamber through the notch of the input shaft.

7. The power transmission device of claim 2, further comprising:
a seal plate provided on the damper side and defining the centrifugal balance chamber; and
a backup ring having a given axial length to support the seal plate,
wherein a through-hole extending in the axial direction is formed in the backup ring as an oil passage,
wherein the centrifugal balance chamber communicates with the through-hole of the backup ring,
wherein the oil drain port for hydraulic fluid is an exit part of the through-hole of the backup ring, and
wherein the oil drain port is provided only in the backup ring.

8. The power transmission device of claim 2, further comprising:
a seal plate provided on the damper side and defining the centrifugal balance chamber;
a backup ring configured to support the seal plate; and
an input shaft coupled to an engine,
wherein a notch communicating with the centrifugal balance chamber is formed in the input shaft,
wherein a notch is formed in a side surface part of the backup ring on the seal plate side,
wherein a through-hole extending in the axial direction is formed in the backup ring and an exit part of the through-hole is formed as the oil drain port for hydraulic fluid, and
wherein the notch of the input shaft, the notch of the backup ring, and the through-hole of the backup ring communicate with each other and are formed as oil passages configured to discharge hydraulic fluid from the centrifugal balance chamber.

9. The power transmission device of claim 8, wherein an oil passage configured to supply hydraulic fluid to the centrifugal balance chamber is formed in the input shaft along the center axis thereof, and the oil passage of the input shaft communicates with the centrifugal balance chamber through the notch of the input shaft.

10. The power transmission device of claim 1, wherein a friction generating mechanism configured to cause the damper to generate a given hysteresis property during power transmission is provided to the damper.

11. The power transmission device of claim 10, further comprising:
a seal plate provided on the damper side and defining the centrifugal balance chamber; and
a backup ring having a given axial length to support the seal plate,
wherein a through-hole extending in the axial direction is formed in the backup ring as an oil passage,
wherein the centrifugal balance chamber communicates with the through-hole of the backup ring,
wherein the oil drain port for hydraulic fluid is an exit part of the through-hole of the backup ring, and
wherein the oil drain port is provided only in the backup ring.

12. The power transmission device of claim 1, further comprising:
a seal plate provided on the damper side and defining the centrifugal balance chamber; and
a backup ring having a given axial length to support the seal plate,
wherein a through-hole extending in the axial direction is formed in the backup ring as an oil passage,
wherein the centrifugal balance chamber communicates with the through-hole of the backup ring,
wherein the oil drain port for hydraulic fluid is an exit part of the through-hole of the backup ring, and
wherein the oil drain port is provided only in the backup ring.

13. The power transmission device of claim 12, further comprising an input shaft coupled to an engine,
wherein a notch communicating with the centrifugal balance chamber is formed in the input shaft,
wherein a notch is formed in a side surface part of the backup ring on the seal plate side, and
wherein the notch of the input shaft, the notch of the backup ring, and the through-hole of the backup ring communicate with each other and are formed as oil passages configured to discharge hydraulic fluid from the centrifugal balance chamber.

14. The power transmission device of claim 13, wherein an oil passage configured to supply hydraulic fluid to the centrifugal balance chamber is formed in the input shaft along the center axis thereof, and the oil passage of the input shaft communicates with the centrifugal balance chamber through the notch of the input shaft.

15. The power transmission device of claim 1, further comprising:
a seal plate provided on the damper side and defining the centrifugal balance chamber;
a backup ring configured to support the seal plate; and
an input shaft coupled to an engine,
wherein a notch communicating with the centrifugal balance chamber is formed in the input shaft,
wherein a notch is formed in a side surface part of the backup ring on the seal plate side,
wherein a through-hole extending in the axial direction is formed in the backup ring and an exit part of the through-hole is formed as the oil drain port for hydraulic fluid, and
wherein the notch of the input shaft, the notch of the backup ring, and the through-hole of the backup ring communicate with each other and are formed as oil passages configured to discharge hydraulic fluid from the centrifugal balance chamber.

16. The power transmission device of claim 15, wherein an oil passage configured to supply hydraulic fluid to the centrifugal balance chamber is formed in the input shaft along the center axis thereof, and the oil passage of the input shaft communicates with the centrifugal balance chamber through the notch of the input shaft.

* * * * *